United States Patent [19]

Patel et al.

[11] Patent Number: 4,671,967
[45] Date of Patent: Jun. 9, 1987

[54] CARBOHYDRATE SYRUPS AND METHODS OF PREPARATION

[75] Inventors: Mansukh M. Patel, Downers Grove; Michael A. Reed, Evanston; William J. Wokas, Bollingbrook; Vasek J. Kures, Willow Springs, all of Ill.

[73] Assignee: Wm. Wrigley Jr. Company, Chicago, Ill.

[21] Appl. No.: 787,964

[22] Filed: Oct. 16, 1985

Related U.S. Application Data

[63] Continuation-in-part of Ser. No. 611,991, May 18, 1984, abandoned.

[51] Int. Cl.$^4$ .................. A23L 1/09; A23G 3/30
[52] U.S. Cl. ........................... 426/658; 426/3
[58] Field of Search ....................... 426/3–6, 426/658, 103, 613

[56] References Cited

U.S. PATENT DOCUMENTS

| Re. 30,197 | 1/1980 | Klose et al. | 426/3 |
|---|---|---|---|
| 2,822,303 | 2/1958 | Campbell et al. | 426/658 |
| 2,976,159 | 3/1961 | Swisher | 426/658 |
| 3,332,783 | 7/1967 | Frey | 426/660 |
| 3,565,765 | 2/1971 | Heady et al. | 426/658 |
| 3,582,359 | 6/1971 | Horn et al. | 426/3 |
| 3,857,965 | 12/1974 | Ream | 426/3 |
| 4,001,435 | 1/1977 | Hirao et al. | 426/658 |
| 4,039,689 | 8/1977 | Bone | 426/658 |
| 4,055,676 | 10/1977 | Foulkes | 426/658 |
| 4,156,740 | 5/1979 | Glass et al. | 426/3 |
| 4,208,431 | 6/1980 | Friello et al. | 426/5 |
| 4,217,368 | 8/1980 | Witzel et al. | 426/5 |
| 4,238,475 | 12/1980 | Witzel et al. | 426/3 |
| 4,248,895 | 2/1981 | Stroz et al. | 426/3 |
| 4,250,196 | 2/1981 | Friello | 426/3 |
| 4,271,197 | 6/1981 | Hopkins | 426/658 |
| 4,271,199 | 6/1981 | Cherukuri et al. | 426/5 |
| 4,276,312 | 6/1981 | Merritt | 426/658 |
| 4,279,931 | 7/1981 | Verwaerde et al. | 426/658 |
| 4,281,028 | 7/1981 | Walon | 426/613 |
| 4,301,178 | 11/1981 | Witzel et al. | 426/3 |
| 4,316,915 | 2/1982 | Friello et al. | 426/5 |
| 4,346,116 | 8/1982 | Verwaerde et al. | 426/658 |
| 4,372,942 | 2/1983 | Cimiluca | 426/658 |
| 4,378,374 | 3/1983 | Reggio et al. | 426/3 |
| 4,382,962 | 5/1983 | Devos et al. | 426/3 |
| 4,384,005 | 5/1983 | McSweeney | 426/250 |
| 4,445,938 | 5/1984 | Verwaerde et al. | 127/29 |
| 4,466,983 | 8/1984 | Cifrese et al. | 426/5 |
| 4,514,422 | 4/1985 | Yang et al. | 426/3 |

FOREIGN PATENT DOCUMENTS

| 0196640 | 8/1986 | European Pat. Off. |
| 0196641 | 8/1986 | European Pat. Off. |
| WO84/01693 | 5/1984 | PCT Int'l Appl. |

OTHER PUBLICATIONS

CCCB: La Revue Eupopeenne des Industriels de la Confiserie, Chocolaterie, Confiturerie, Biscuiterie, Boulangerie and Pastisserie, Sep. 1977, pp. 26–31.

Primary Examiner—Jeanette Hunter
Attorney, Agent, or Firm—Willian Brinks Olds Hofer Gilson & Lione Ltd.

[57] ABSTRACT

Carbohydrate syrup-plasticizer compositions for use in chewing gums to improve flexibility and methods of preparing the compositions are disclosed. The syrup comprises carbohydrate solids and water, with less than 30% of the solids having a degree of polymerization (DP) of 1 and more than 20% solids with a DP of 4 or greater. The ratio of carbohydrate solids to plasticizing agent in the composition is between 0.5:1 and 100:1 and the total water content of composition is less than 20%. The syrup-plasticizer composition is prepared by providing a carbohydrate syrup or combined syrups with the proper carbohydrate solids distribution, combining a plasticizer such as glycerine or propylene glycol and evaporating water from the combined syrup composition.

46 Claims, No Drawings

CARBOHYDRATE SYRUPS AND METHODS OF PREPARATION

CROSS REFERENCE TO RELATED APPLICATION

This application is a continuation-in-part application of U.S. application Ser. No. 611,991, filed May 18, 1984, now abandoned, in the name of Mansukh M. Patel, Michael A. Reed and Vasek J. Kures and entitled "Composition and Method for Improved Flexibility Retention in Chewing Gum."

BACKGROUND OF THE INVENTION

The present invention relates generally to improved carbohydrate syrup compositions and methods of preparation of carbohydrate syrup compositions.

The use of carbohydrate syrups in a variety of confections, including chewing gum, is well known in the art. In particular, relatively low D.E. (dextrose equivalent) carbohydrate syrups are especially desirable for the texture and binding effects which the solids in such syrups provide in certain applications.

However, in some carbohydrate syrup-containing confections it has been found that relatively high levels of moisture present in typical carbohydrate syrups have proven unsatisfactory for various reasons. For example, conventional chewing gum has been generally thought to require a moisture content of approximately 3 to 5 percent by weight for acceptable softness and flexibility. Nearly all of the moisture in chewing gum is provided by carbohydrate syrups such as conventional corn syrups or sugar alcohol syrups (including sorbitol solutions and hydrogenated starch hydrolysate solutions) typically added to chewing gum compositions to improve binding and softness characteristics in the gum. A major problem with conventional gum compositions is that they gradually become hard and brittle from moisture loss which occurs when the chewing gum is stored at a relative humidity lower than the equilibrium relative humidity of the gum. When moisture is lost from the gum, ingredients originally dissolved in the water recrystallize, causing the gum to become stiff and brittle. For this reason, chewing gum is typically wrapped in moisture-impermeable packages to prevent loss of moisture. However, even with such packaging, the moisture may eventually migrate out of the gum.

In sugarless chewing gums, hydrogenated starch hydrolysates and sugar alcohols such as sorbitol are often used as sweeteners and bulking agents. Such sugarless gums are hygroscopic in nature, attracting moisture from the atmosphere. The result is that, over time, sugarless gums often become "sticky" and loose their body and texture. It is desirable to use relatively low-moisture formulations including low-moisture carbohydrate syrups in such gums so that the gums will be able to withstand greater moisture absorption before they reach an undesirably "sticky" state.

In sugarless gums, it is sometimes advantageous to use hydrogenated starch hydrolysate solutions rather than sorbitol solutions because of the greater binding effects of the higher molecular weight components in the hydrogenated starch hydrolysates solids. However, hydrogenated starch hydrolysate syrups typically have a relatively high moisture level. The reduction of the amount of moisture in such syrups allows more hydrogenated starch hydrolysates to be used without exceeding moisture limitations in the final chewing gum products.

Furthermore, it has been found desirable to minimize the moisture content of food systems including chewing gum compositions in order to prevent the deterioration of certain moisture-sensitive ingredients. For example, it is well known that the stability of artificial dipeptide sweeteners such as aspartame (L-spartyl-L-phenylalanine methyl ester) in a food system is a function of water activity, time, temperature and pH. In aqueous systems, aspartame spontaneously converts to diketopiperazine with proportional loss of sweetness. The rate of this conversion reaction can be controlled by minimizing the water activity in food systems containing aspartame.

These and other undesirable effects of relatively high moisture levels in confections, particularly chewing gums, containing carbohydrate syrup compositions can be minimized by reducing or evaporating moisture from the carbohydrate syrups. However, problems have been encountered in economically evaporating moisture initially present in certain carbohydrate syrup compositions, particularly low D.E. carbohydrate syrups, to desired relatively low levels. Specifically, as such syrups are evaporated, their viscosities increase substantially, with the result that at some moisture levels the syrups cannot be economically processed in conventional evaporating equipment. Furthermore, even when evaporation to a desired moisture content is possible, further handling of the syrup, especially if it is cooled after evaporation, is difficult if not impossible. Thus, the syrup must be kept hot to facilitate handling and used quickly to prevent degradation gradation by the heat. If the syrup is cooled, the extreme viscosity makes reheating it a slow and difficult process.

SUMMARY OF THE INVENTION

The present invention is directed to improved carbohydrate syrup compositions and methods of preparing carbohydrate syrup compositions suitable for use in confections, especially chewing gums, which overcome these and other disadvantages of prior known carbohydrate syrups and preparation methods.

According to one aspect of the present invention, an improved method of preparing a carbohydrate-plasticizer syrup composition generally comprises the steps of providing a syrup of water and carbohydrate solids having less than about 30% solids with a degree of polymerization ("DP") of 1 and at least about 20% solids with a DP of 4 or greater, combining the syrup with a plasticizing agent consisting of glycerine or propylene glycol or a mixture thereof at a weight ratio between about 0.5:1 and about 100:1 carbohydrate solids to plasticizing agent, and then evaporating moisture from the mixture so that the water content of the mixture is less than about 20% by weight. The premixing of the plasticizing agent with the syrup prior to evaporation of its moisture facilitates the process of evaporation and allows the syrup to be evaporated at a higher rate and to a higher solids level by reducing the viscosity of the syrup. The resulting syrups are easily handled and can be conveniently stored at relatively low temperatures.

Other aspects of the present invention are directed to the improved carbohydrate syrup-plasticizer compositions which provide improved texture, binding, and shelf-life characteristics in the confections in which they are used. These improved syrup-plasticizer compositions are characterized by carbohydrate DP distributions which promote flexibility and softness of confections, particularly chewing gum compositions, during storage. It is believed that the combination of large amounts of high DP carbohydrate solids with low DP solids provides these flexibility and softness characteristics. It is also believed that these syrup-plasticizer compositions reduce the susceptibility of confections to re-crystallization of ingredients as a result of moisture loss which occurs during storage.

Specifically, such syrup-plasticizer compositions according to one aspect of the present invention comprise not greater than about 20% by weight water from all sources, one or more carbohydrate syrups containing not more than 30%, by weight of dry solids, carbohydrates which have a DP of 1 and at least 20% carbohydrates having a DP of 4 or greater, and a plasticizing agent consisting of glycerine or propylene glycol or a mixture thereof at a weight ratio of between about 0.5:1 and about 100:1 carbohydrate solids to plasticizing agent. Such carbohydrate distributions may be obtained by combining a relatively high D.E. corn syrup with a relatively low D.E. corn syrup, each syrup constituting from about 20% to about 80% by weight of the syrup-plasticizer composition.

The present invention, in both its method and composition aspects, will be best understood from the following descriptions of presently preferred embodiments of the invention, which are intended to be merely illustrative of the various aspects of the invention rather than limiting.

DETAILED DESCRIPTION OF THE PRESENTLY PREFERRED EMBODIMENTS

Conventional carbohydrate syrups used in confections including chewing gum typically contain moisture in the range of from about 15% to about 30% by weight. This moisture, when combined with the moisture present in other typical confection ingredients, frequently results in undesirable effects including reduced confection shelf life and unsatisfactory texture characteristics. One aspect of the present invention is based upon the recognition that reducing the moisture level of a carbohydrate syrup will result in an overall decrease in the moisture level of the confection in which the syrup is used. However, the viscosities and recrystalization of carbohydrate syrups during evaporation is highly dependant on the DP distribution of the carbohydrate solids. Syrups with high levels of high DP carbohydrates desirable for use in the present invention for their binding and flexibility enhancing characteristic are very viscous when evaporated to the low moisture levels found desirable in the present invention.

While in theory the carbohydrate solids DP distribution may be contrived by mixing individual components, generally only dextrose and sorbitol (and to a slight extent maltose) are available commercially by themselves. Typically, the DP distribution of corn syrups and hydrogenated starch hydrolysate syrups are governed by the method of preparation, and a broad variety of different DP components are present. Thus, typically a syrup having a large proportion of solids with a DP of 4 or greater will have many of the solids with a DP of 7, 8 and even 10 or more. Syrups such as these have in the past presented practical limitations on the amounts of moisture which can be removed economically from the syrups using conventional evaporating equipment.

In general, the carbohydrate syrups useful in the present invention have less than 30% solids with a DP of 1 and more than about 20% solids with a DP of 4 or greater. More preferably, the level of solids with a DP of 1 is less than about 10% by weight. For some applications, particularly sugar and corn syrup carbohydrate syrups, it is preferable to have 30% or more solids with a DP of 4 or greater, most preferably about 35% to 40% solids with a DP of 4 or greater.

In general, the improved method of preparing a carbohydrate syrup composition according to the present invention comprises the step of combining a carbohydrate syrup with a glycerine or propylene glycol plasticizing agent in a weight ratio of between about 0.5:1 and about 100:1, preferably between 0.75:1 and 40:1 and most preferably between 2:1 and 30:1, carbohydrate solids to plasticizing agent, and evaporating the moisture initially present in the syrup-plasticizing agent combination.

The glycerine or propylene glycol plasticizing agent, which is combined with the carbohydrate syrup, facilitates the evaporation of moisture initially present in the syrup-plasticizing agent combination and permits the evaporation of the moisture using conventional evaporating equipment. In particular, the plasticizing agent reduces the viscosity of the syrup to speed the evaporation process and allow reduction of moisture to desired low levels. It also facilitates handling and storage of the syrup after evaporation.

As used herein, the term "carbohydrate" is intended to be used in its broadest sense to cover sugars and starch hydrolysates, such as but not limited to saccharides, polysaccharides (such as corn syrup solids), starches and mixtures thereof, as well as sugar alcohols and hydrogenated starch hydrolysates, such as but not limited to hydrogenated saccharides, hydrogenated polysaccharides, hydrogenated starches and mixtures thereof.

Known plasticizing agents include glycerine (also known as glycerol), propylene glycol and mixtures thereof. The preferred plasticizing agent is glycerine. The glycerine will preferably contain less than 1% water. Glycerine with higher moisture content can be used but correspondingly greater evaporation of the syrup will be required. The syrup and plasticizing agent are combined using conventional mixing apparatus which is well known in the art.

In the present invention, moisture initially present in the syrup-plasticizing agent combination is removed by evaporation. The amount of moisture which can be evaporated will depend upon the initial moisture level of the carbohydrate syrup, the amount of plasticizing agent used and the carbohydrate distribution of the syrup. The amount of moisture removal preferred will also depend on these same factors and the other ingredients in the composition in which the carbohydrate syrup is used. It is recognized that the easy evaporation of moisture made possible by the addition of a plasticizing agent will not be beneficial in all contexts, but in the context of the present invention, the method permits removal of initial moisture by amounts of 20%, 50% or even 75%. For syrup-plasticizer compositions used in chewing gums in the present invention, the moisture level will be evaporated to below 20%, preferably below 14% for some compositions and as low as 10% or even 5% for other compositions.

The evaporation of the syrup composition of the present invention can be accomplished using conventional evaporation equipment, two examples of which are next described. The preferred evaporator is a known agitated heated kettle such as a 150-gallon size kettle with an anchor type impeller such as the device manufactured by Groen Process Equipment Group, a Division of the Dover Corporation of Elk Grove Village, Ill. In such an evaporator, a high-viscosity material cannot be stirred. In the present invention, the plasticizing agent keeps the viscosity of the evaporating syrup composition low to permit moisture to be evaporated from the syrup, leaving desired relatively high solids levels.

Alternatively, a tube evaporator, preferably a device such as a thin film evaporator manufactured under the trademark "PARAVAP" by APV Equipment, Incorporated of Tonowanda, N.Y., can also be used. This evaporator is a "falling film" type evaporator in which the material from which the moisture is to be evaporated descends the sides of a heated tube or pipe, which conducts heat to evaporate the moisture. If the material is too viscous, it would not flow down the tube.

Another evaporator known as a "wiped film evaporator" such as the device manufactured by the Luwa Corporation of Charlotte, N.C. can also be used for high-viscosity materials. Such an evaporator is similar to a tube evaporator, but employs a wiping blade inside the tube which removes materials from contact with the surface of the tube. Although this evaporator is excellent for use with heat-sensitive and high-viscosity materials because of the action of the wiping blade, it is more expensive than an equivalent tube evaporator and requires more maintenance. Thus it is not conventionally used to evaporate carbohydrate syrups. The present invention makes it possible to use the conventional evaporating equipment without resort to use of a wiped film evaporator.

In syrup compositions of the present invention employing corn syrups, the carbohydrate solids therein comprise not more than about 30% and preferably not more than 20% by weight saccharides having a DP of 1. Such a carbohydrate distribution can be obtained by using a relatively low D.E. corn syrup such as the syrup manufactured by the A.E. Staley Manufacturing Company of Decatur, Ill. under the brandname "Staley 300". This syrup has a D.E. of about 35, with a carbohydrate solids distribution of about 14% with a DP of 1 and about 63% with a DP of 4 or greater. This solids distribution is in the range of syrups preferred for use in certain chewing gums because of the texture and binding effects which such low D.E. syrups achieve.

Preferred carbohydrate distributions may be obtained by using a blend of relatively low D.E. and high D.E. syrups. As used herein, the term "relatively low D.E." refers to a D.E. of not greater than about 40, and "relatively high D.E." refers to a D.E. of not less than about 40.

In one embodiment of the invention, using starch hydrolysates (corn syrup solids), the syrup mixture preferably comprises 1-5% plasticizing agent, not less than about 20% by weight maltose and not less than about 10% by weight of saccharides having DP 10 or greater, the carbohydrate percentages being expressed in terms of dry solids in the syrup. This preferred carbohydrate distributions can be readily obtained by combining a relatively high D.E. high-maltose corn syrup with a relatively low D.E. corn syrup, both syrups constituting within the range of from about 25% to about 70% by weight of the syrup-plasticizer mixture.

A preferred range of maltose in the high D.E. syrup is between about 40% and about 50% by weight of dry solids.

In terms of dry solids, a specific preferred syrup mixture of this embodiment comprises about 32% by weight maltose, about 20% by weight of saccharides having DP 10 or greater, and about 6% by weight dextrose. This formulation can be obtained by combining a 50 D.E., high-maltose syrup with a 20 D.E. syrup in the following weight percentage amounts: about 55% by weight of the high D.E. corn syrup, and about 42.5% by weight of the low D.E. corn syrup; the remainder comprises a platicizing agent. In the high D.E. syrup, maltose should constitute about 44% by weight of dry solids.

The syrup mixture of this embodiment of the invention may be added to a chewing gum composition as a substitute for conventional corn syrups, and, apart from preparation of the syrup and the step of adding it to chewing gum, the remaining aspects of chewing gum manufacture may be carried out in accordance with techniques which are well-known in the art.

EXAMPLE 1

An example of a preferred formulation of one embodiment of the invention is as follows:

| Ingredient | % By Weight |
|---|---|
| 50 D.E. (high maltose) corn syrup | 55.0 |
| 20 D.E. corn syrup | 42.5 |
| Glycerol (or propylene glycol) | 2.5 |
| | 100.0 |

The weight percentages are amounts of ingredients in the syrup mixture prior to evaporation of water therefrom. After the syrups and plasticizer are combined, water is evaporated from the mixture until a moisture level of not greater than about 14% by weight is obtained. When evaporation is completed, the amount of plasticizer in the syrup will be about 3% by weight of the syrup. The high and low D.E. syrups in this example are supplied by the A. E. Staley Manufacturing Company under the brand names "Staley 7350" (high maltose syrup) and "Staley 200", respectively. The carbohydrate solid distribution of this combined syrup has about 6% solids with a DP of 1 and about 45% solids with a DP of 4 or greater.

EXAMPLE 2

A chewing gum composition which benefits from the characteristics imparted by the above syrup composition can be prepared by combining the following ingredients in a conventional manner.

| Ingredient | % By Weight |
|---|---|
| Gum Base | 20.0 |
| Sugar | 54.3 |
| Syrup of Example 1 | 25.0 |
| Flavor | 0.7 |
| | 100.0 |

Conventional gum bases and flavorings can be used. The chewing gum will have good textural properties which will be retained over prolonged storage.

The carbohydrate solids in the carbohydrate syrup compositions in the present invention may comprise hydrogenated starch hydrolysates solids, corn syrup solids or a mixture of hydrogenated starch hydrolysates solids and corn syrup solids. The hydrogenated starch hydrolysates solids preferably comprise not more than about 25% by weight hydrogenated saccharides having a DP of 1 and not less than 20% by weight hydrogenated saccharides having a DP of 4 or greater. A preferred hydrogenated starch hydrolysate syrup is the "LYCASIN" brand hydrogenated starch hydrolysate syrup manufactured by the Roquette Corporation New York, N.Y. (hereinafter "Lycasin HSH").

This syrup contains about 25% water. The carbohydrate distribution of Lycasin HSH is about 6% oligosaccharides of a DP of 1, about 52% with a DP of 2, about 18% with a DP of 3, about 1.5% with a DP of 4, about 2% with a DP of 5, about 3.7% with a DP of 6, about 3.4% with a DP of 7, about 2.2% with a DP of 8, about 1.0% with a DP of 9 and about 11% with a DP of 10 or greater. Lycasin HSH thus has about 24% carbohydrates with a DP of 4 or greater. A higher concentration of high DP hydrogenated starch hydrolysate may be preferred in terms of providing flexibility to chewing gum, but Lycasin HSH is preferred because it is generally recognized as safe in food products and it has non-cariogenic properties which might be lost if a greater amount of high DP carbohydrates were present. Hydrogenated starch hydrolysates and methods for their preparation are described in U.S. Pat. Nos. 4,279,931, issued July 21, 1981, and 4,346,116, issued Aug. 24, 1982.

EXAMPLE 3

A preferred sugarless syrup prepared according to the present invention comprises 78% by weight Lycasin HSH syrup and 22% glycerine. The initial moisture content of this syrup is 20%, but is reduced to 8% by evaporation in an agitated kettle to yield a product with 67% Lycasin HSH solids, 25% glycerine and 8% water. The Lycasin HSH solids distribution is unchanged by the process.

EXAMPLE 4

A preferred sugarless chewing gum formula which uses the syrup prepared in Example 3 can be produced by combining the following ingredients:

| Ingredient | % By Weight |
| --- | --- |
| Gum Base | 25.0 |
| Syrup of Example 3 | 17.0 |
| Sorbitol | 49.0 |
| Mannitol | 8.0 |
| Flavor | 1.0 |
|  | 100.0 |

The total moisture content of the gum will be less than 2%, but the product will be unusually flexible for a sugarless gum. Moreover, because of the low moisture content the product will not dry out and aspartame (if added as an optional ingredient) will exhibit good stability.

EXAMPLE 5

It may be advantageous in some instances to combine a hydrogenated starch hydrolysate syrup with a corn syrup. One such combination is produced by combining the previously described "Staley 200" corn syrup in an amount of about 35% by weight of the combination with Lycasin HSH in an amount of about 60% by weight of the combination and glycerine in an amount of about 5% by weight of the combination. The water content of the syrup is reduced from about 23% to about 16%. At this point the syrup will comprise about 78% carbohydrate solids, 16% water and a little more than 5% glycerine. The carbohydrate solids distribution will be less than 7% with a DP of 1 and greater than 40% with a DP of 4 or greater.

EXAMPLE 6

Non-tack chewing gum base formulas are described in U.S. Pat. No. 3,948,380 to Comollo. These bases produce chewing gums which are desirable in that they do not adhere to teeth or to most dental appliances. However, the nature of these gum bases is such that they require good binding characteristics in the gum formulas in which they are used. The gums also tend to dry out and become brittle over time.

A non-tack, peppermint flavored chewing gum can be prepared from the following formula:

| Ingredient | % By Weight |
| --- | --- |
| Gum Base | 20.0 |
| Sugar | 54.3 |
| Syrup of Example 5 | 25.0 |
| Peppermint Oil | 0.7 |
|  | 100.0% |

The gum base used may be a non-tack gum base as disclosed in the Comollo patent. The gum so produced will have good cohesion and chewing texture. It will also exhibit improved resistance to drying out when stored over long periods of time due to the hygroscopicity of the Lycasin HSH solids.

It should be understood that the carbohydrate syrup compositions and methods described in detail herein are merely illustrative of various aspects of the invention rather than limiting, and that various changes and modifications to the presently preferred embodiments described may be made. It is intended that the following claims, including all equivalents, therefore define the scope of the invention.

We claim:

1. A method of preparing a syrup-plasticizer composition for use in a chewing gum formulation comprising the steps of:
    (a) combining a syrup, comprising carbohydrate solids having less than about 30% solids with a degree of polymerization (DP) of 1 and at least about 20% solids with a DP of 4 or greater, with a plasticizing agent consisting of glycerine, propylene glycol or a mixture thereof in a weight ratio of between about 0.5:1 to about 100:1 carbohydrate solids to plasticizing agent; and
    (b) evaporating moisture in the syrup-plasticizer mixture so that the total water content of the evaporated syrup-plasticizer composition is less than about 20% by weight.

2. The method of claim 1 wherein at least 20% of the moisture initially present in the carbohydrate syrup-plasticizing agent combination is evaporated therefrom.

3. The method of claim 1 wherein at least 50% of the moisture initially present in the carbohydrate syrup-plasticizing agent combination is evaporated therefrom.

4. The method of claim 1 wherein at least 75% of the moisture initially present in the carbohydrate syrup-plasticizing agent combination is evaporated therefrom.

5. The method of claim 1 wherein the final moisture level of the carbohydrate syrup-plasticizer composition is not more than 14% by weight thereof.

6. The method of claim 1 wherein the final moisture level of the carbohydrate syrup-plasticizer composition is not more than 10% by weight thereof.

7. The method of claim 1 wherein the final moisture level of the carbohydrate syrup-plasticizer composition is not more than 5% by weight thereof.

8. The method of claim 1 wherein the carbohydrate solids comprise corn syrup solids.

9. The method of claim 1 wherein the carbohydrate solids comprise hydrogenated starch hydrolysate solids.

10. The method of claim 1 wherein the carbohydrate solids comprise a mixture of corn syrup solids and hydrogenated starch hydrolysate solids.

11. The method of claim 1 wherein the evaporating step is carried out by agitating and heating the syrup-plasticizing agent combination in an agitated heated kettle.

12. The method of claim 1 wherein the evaporating step is carried out by passing the carbohydrate syrup-plasticizing agent combination through a thin film evaporator.

13. The method of claim 1 wherein the plasticizing agent is glycerine at a weight ratio of from about 0.75:1 to about 40:1 carbohydrate solids to glycerine.

14. The method of claim 13 wherein the ratio of carbohydrate solids to glycerine is between about 2:1 and about 30:1.

15. The method of claim 1 wherein the carbohydrate solids comprise less than about 20% carbohydrates having a DP of 1.

16. The method of claim 1 wherein the carbohydrates solids comprise less than about 10% carbohydrates having a DP of 1.

17. The method of claim 1 wherein the carbohydrate solids comprise hydrogenated starch hydrolysates with about 24% of the carbohydrates having a DP of 4 or greater.

18. The method of claim 1 wherein the carbohydrate solids comprise corn syrup solids with about 30% or more of the carbohydrates having a DP of 4 or greater.

19. The method of claim 18 wherein about 35% to 40% of the carbohydrate solids have a DP of 4 or greater.

20. The method of claim 1 wherein the carbohydrate solids comprise hydrogenated starch hydrolysate solids containing about 6% oligosaccharides of a DP of 1, about 52% with a DP of 2, about 18% with a DP of 3 and about 11% with a DP of 10 or greater.

21. The method of claim 1 wherein the carbohydrate solids are corn syrup solids comprising not less than about 20% by weight maltose.

22. The method of claim 1 wherein the carbohydrate syrup comprises a mixture of 20% to 80% by weight of a syrup with a D.E. of greater than 40 and 20% to 80% of a syrup with a D.E. of less than 40.

23. A method of preparing a carbohydrate syrup-plasticizer composition for use in a chewing gum comprising the steps of:
(a) combining a carbohydrate syrup comprising water and carbohydrate solids with a plasticizer selected from the group of glycerine, propylene glycol and mixture thereof at a weight ratio of carbohydrate solids to plasticizer of between about 0.5:1 and about 100:1
(b) said carbohydrate solids comprising less than about 20% by weight carbohydrates with a DP of 1 and at least about 20% carbohydrates with a DP of 4 or greater; and
(c) evaporating moisture from the carbohydrate syrup-plasticizer mixture to reduce its moisture content to less than about 20% by weight of the mixture.

24. The method of claim 23 wherein the carbohydrate solids comprise hydrogenated starch hydrolysates.

25. The method of claim 23 wherein the carbohydrate solids comprise corn syrup solids.

26. A method of preparing a carbohydrate syrup-plasticizer composition for use in a chewing gum formulation comprising the steps of:
(a) providing a carbohydrate syrup selected from the group of corn syrups, hydrogenated starch hydrolysate syrups and mixtures thereof wherein not greater than about 20% of the total carbohydrate solids have a DP of 1 and wherein at least about 24% of the total carbohydrate solids have a DP of 4 or greater;
(b) combining said syrup with a plasticizing agent selected from the group of glycerine, propylene glycol and mixtures thereof at a weight ratio of total carbohydrate solids to plasticizing agent of between about 0.5:1 and about 100:1; and
(c) evaporating water from the resulting mixture until there is less than 14% water in the mixture.

27. A method of preparing a low water content carbohydrate syrup comprising the steps of:
(a) providing an aqueous carbohydrate syrup comprising water and carbohydrate solids wherein less than about 30% of the carbohydrate solids have a DP of 1, and greater than about 20% of the carbohydrate solids have a DP of 4 or greater;
(b) combining said syrup with a plasticizing agen selected from the group of glycerine, propylene glycol and mixture thereof in a ratio of between about 0.75:1 and 40:1 carbohydrate solids to plasticizing agent; and
(c) evaporating water from the combined syrup-plasticizing agent mixture until the water content of the mixture is less than about 14% by weight.

28. The method of claim 27 wherein conventional evaporting equipment is used to evaporate water from the mixture.

29. The method of claim 27 wherein the carbohydrate solids comprise hydrogenated starch hydrolyosates with about 24% of more of the carbohydrates having a DP of 4 or greater.

30. The method of claim 27 wherein the ratio of carbohydrate solids to plasticizing agent is between about 2:1 and about 30:1.

31. The method of claim 27 wherein the water in the mixture of plasticizing agent and syrup is evaporated to less than about 10%.

32. A carbohydrate syrup-plasticizer composition for use in a chewing gum comprising:
(a) a carbohydrate syrup selected from the group of corn syrups, hydrogenated starch hydrolysate syrups and mixtures thereof wherein not greater than about 30% of the total carbohydrate solids have a DP of 1 and wherein at least about 20% of the total carbohydrate solids have a DP of 4 or greater;

(b) a plasticizing agent selected from the group of glycerine, propylene glycol and mixtures thereof;

(c) wherein the ratio of carbohydrate solids to plasticizing agent is between about 0.5:1 and about 100:1; and (d) wherein the water content of the carbohydrate syrup plasticizer composition is less than 20%.

33. A carbohydrate syrup composition comprising:

(a) carbohydrate solids wherein less than about 20% of said solids have a DP of 1 and greater than about 20% of said solids have a DP of 4 or greater, (b) a plasticizing agent selected from the group of glycerine, proplyene glycol and mixtures thereof at a ratio of carbohydrate solids to plasticizing agent of between about 0.5:1 and about 100:1; and (c) less than about 20% water.

34. The composition of claim 33 wherein the carbohydrate solids comprise hydrogenated starch hydrolysates with about 24% or more of the carbohydrates having a DP of 4 or greater.

35. The composition of claim 33 wherein the ratio of carbohydrate solids to plasticizing agent is between about 0.75:1 and about 40:1.

36. The composition of claim 33 comprising less than about 14% water.

37. A carbohydrate syrup mixture for use in a chewing gum composition for improved flexibility retention, the mixture comprising water in an amount not greater than about 20% by weight of the mixture, starch hydrolysate solids having less than 30% solids with a DP of 1 and at least about 20% solids with a DP of 4 or greater, and a plasticizing agent selected from the group consisting of glycerol and propylene glycol and constituting from about 1% to about 5% by weight of the mixture.

38. The syrup mixture of claim 37 wherein the amount of plasticizing agent is about 3% by weight of the mixture.

39. The syrup mixture of claim 37 wherein the amount of water is not greater than about 14% by weight of the mixture.

40. The syrup mixture of claim 37 wherein the starch hydrolysate solids comprise not less than about 20% by weight maltose.

41. The syrup mixture of claim 37 wherein the starch hydrolysate solids comprise not less than about 10% by weight of saccharides having DP of 10 or greater.

42. The syrup mixture of claim 37 wherein the starch hydrolysate solids comprise about 32% by weight maltose and about 20% by weight of saccharides having DP of 10 or greater.

43. A carbohydrate syrup mixture for use in a chewing gum composition to improve the flexibility and extend the shelf-life thereof, the syrup mixture comprising:

(a) a high D.E. corn syrup constituting from about 25% to about 70% by weight of the mixture and having a D.E. of not less than about 40;

(b) a low D.E. corn syrup constituting from about 25% to about 70% by weight of the mixture and having a D.E. of not greater than about 40;

(c) not greater than 20% by weight water; and (d) a plasticizing agent selected from the group consisting of glycerol and propylene glycol and constituting from about 1% to about 5% by weight of the mixture.

44. The syrup mixture of claim 43 wherein the high D.E. syrup contains from about 40% to about 50% maltose by weight of dry solids.

45. The syrup mixture of claim 43 wherein the high D.E. syrup has a D.E. of about 50 and constitutes about 55% by weight of the mixture; the low D.E. syrup has a D.E. of about 20 and constitutes about 42.5% by weight of the mixture; and the high D.E. syrup contains about 44% maltose by weight of dry solids.

46. The syrup mixture of claim 43 wherein the water content of not greater than about 14% by weight of the mixture.

* * * * *

UNITED STATES PATENT AND TRADEMARK OFFICE
CERTIFICATE OF CORRECTION

PATENT NO. : 4,671,967

DATED : June 9, 1987

INVENTOR(S) : Mansukh M. Patel et al.

It is certified that error appears in the above-identified patent and that said Letters Patent is hereby corrected as shown below:

On the title page, under the heading "Inventors", please delete "Bollingbrook" and substitute therefor --Bolingbrook--.

In column 3, line 46, please delete "recrystalization" and substitute therefor --re-crystalization--.

In column 6, line 13, please delete "platicizing" and substitute therefor --plasticizing--.

In column 7, line 12, after "Corporation" please insert --of--.

In column 10, line 2, after "100:1" please insert --;--.

UNITED STATES PATENT AND TRADEMARK OFFICE
CERTIFICATE OF CORRECTION

PATENT NO. : 4,671,967

DATED : June 9, 1987

INVENTOR(S) : Mansukh M. Patel et al.

It is certified that error appears in the above-identified patent and that said Letters Patent is hereby corrected as shown below:

In column 10, line 39, please delete "agen" and substitute therefor --agent--.

In column 11, line 11, after "greater" please insert --;--.

Signed and Sealed this

Twenty-eighth Day of January, 1992

Attest:

HARRY F. MANBECK, JR.

*Attesting Officer*      *Commissioner of Patents and Trademarks*